United States Patent [19]

Hamana

[11] Patent Number: 5,392,394
[45] Date of Patent: Feb. 21, 1995

[54] SYSTEM FOR GENERATING DIFFERENT KINDS OF DIGITAL VIDEO SIGNALS

[75] Inventor: Yuichi Hamana, Kanagawa, Japan

[73] Assignee: Sony Corporation, Tokyo, Japan

[21] Appl. No.: 122,618

[22] Filed: Sep. 17, 1993

Related U.S. Application Data

[63] Continuation of Ser. No. 703,824, May 21, 1991, abandoned.

[30] Foreign Application Priority Data

May 25, 1990 [JP] Japan .................... 2-134165

[51] Int. Cl.[6] .............................. G06F 3/14
[52] U.S. Cl. ................... 395/163; 395/162; 364/228.3; 364/230.4
[58] Field of Search ............... 395/162–166, 395/325, 650, 800; 364/228.3, 230.4

[56] References Cited

U.S. PATENT DOCUMENTS

| | | | |
|---|---|---|---|
| 4,727,423 | 2/1988 | Kaneko et al. | 395/164 |
| 4,855,908 | 8/1989 | Shimoda et al. | 364/900 |
| 4,941,107 | 7/1990 | Hasebe | 395/164 |
| 5,036,453 | 7/1991 | Renner et al. | 364/200 |
| 5,056,000 | 10/1991 | Chang | 364/200 |
| 5,072,374 | 12/1991 | Sexton et al. | 364/200 |
| 5,086,345 | 2/1992 | Nakane et al. | 358/906 |
| 5,089,819 | 2/1992 | Yokosuka et al. | 341/61 |
| 5,121,486 | 6/1992 | Kurihara et al. | 364/DIG. 1 |

Primary Examiner—Mark R. Powell
Assistant Examiner—Kee M. Tung
Attorney, Agent, or Firm—Jay H. Maioli

[57] ABSTRACT

A system with a small scale hardware construction of a comparatively small memory capacity generates many kinds of digital video signals. The digital video signal generator includes at least one set of central processing units, a read only memory in which calculation programs in accordance with which digital video signals are to be calculated by the central processing units are stored, a random access memory for storing therein digital video signals calculated by the central processing units in accordance with the calculation programs, and a signal selector for selectively reading out the thus stored digital video signals from the random access memory.

5 Claims, 5 Drawing Sheets

FIG. I(b)
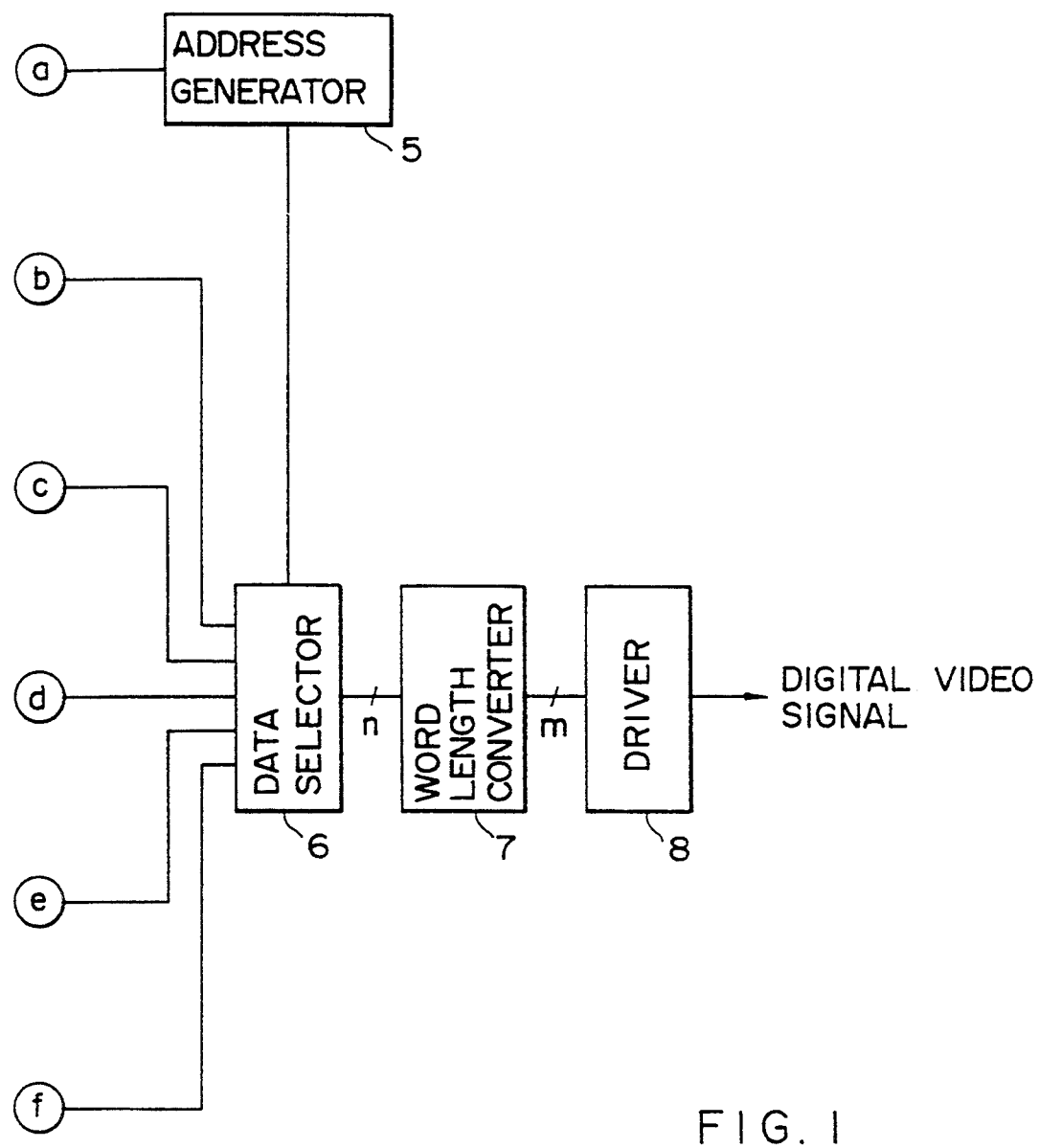
FIG. I
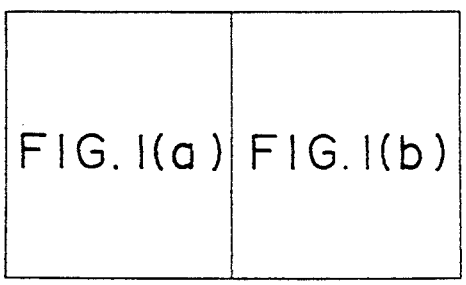

FULL FIELD COLOR BAR

8-FIELD MEMORY (PER PAL SIGNAL) x
NUMBER OF KINDS OF SIGNALS

SYSTEM FOR GENERATING DIFFERENT KINDS OF DIGITAL VIDEO SIGNALS

This is a continuation of application Ser. No. 07/703,824, filed May 21, 1991, now abandoned.

BACKGROUND OF THE INVENTION

1. Field of the Invention

This invention relates to a generator for generating digital video signals suitable for use for the measurement or adjustment of a digital video appliance such as, for example, a video tape recorder of the digital recording method, and more particularly to a digital video signal generator for generating digital video signals, for which a great memory capacity is required for every kind of signals in a broadcasting system or in a high quality television system wherein the period for which the phases of a horizontal synchronizing signal and a subcarrier are to be synchronized correctly with each other is long, with a hardware construction of a small memory capacity and a small scale.

2. Description of the Prior Art

A video signal generator is employed for the measurement, adjustment, inspection and so forth of a video tape recorder (VTR).

A conventional analog signal generator for an analog VTR can generate normally 10 to 20 kinds of signals, or in some cases, 30 or more kinds of signals. However, video signals handled in a VTR of the digitally recording type are digital signals of, for example, 8 to 10 bits/sample, and a conventional analog video signal generator cannot be used for such VTR of the digital recording type. Simply, it may be an idea to convert an output of an analog video signal generator into a digital signal. However, a digital signal obtained by such analog to digital conversion does not have a sufficient degree of accuracy for the measurement or adjustment of a digital VTR. Thus, it is a conventional method to write desired signals in advance into read only memories (ROMs) for individual kinds of signals as seen in FIG. 4 and designate an address of one of the ROMs in which a necessary signal is stored to read out the necessary signal. However, such conventional method requires a great ROM capacity, and there is a problem that, each time a kind of a necessary signal increases, a ROM for the storage of such necessary signal is additionally required. The problem will be described by way of an example of a video signal.

Referring to FIG. 3(a), there is illustrated an example of a screen when a waveform can be produced freely in a horizontal direction of the screen but it is only necessary for an indication on the screen to have same patterns in a vertical direction. The screen shown includes an indication of full field color bars.

FIG. 3(b) illustrates an example of a signal of the n-th line of the screen shown in FIG. 3(a). Here, a phase relationship between a horizontal synchronizing signal (H-SYNC) and a color subcarrier (particularly a burst signal) will be examined and a memory capacity necessary for the storage of digital video signal will be calculated. It is to be noted that, since a memory capacity for signals for a vertical synchronizing signal interval can be assured with a small hardware construction, such memory capacity is not taken into consideration here.

First, in the case of the NTSC system, if the sampling frequency $f_s$ is selected to four times the subcarrier frequency $f_{sc}$, since $4 \times f_{sc} = f_s = 910 f_H$ stands where $f_H$ is a frequency of a horizontal synchronizing signal, $2 \times f_{sc} = 455 \times f_H$ is obtained by conversion, and it can be seen that the burst signal is divisible for each 2 lines.

Such relationship is illustrated in FIG. 3(c) wherein the burst signal is reversed in phase for every other line so that the original phase is restored for each two lines. While the n-th line and the n+1-th line look in the same colors on a monitor screen, when a signal is to be produced using a ROM, a memory capacity for two lines is required.

Accordingly, a memory capacity necessary for a single signal for a screen which includes an indication of same vertical patterns includes 910 (samples)×10 (bits)×2 (lines)=18,200 bits, and if a condition is provided that a screen has an indication of same vertical patterns, then the capacity of a ROM for the NTSC system can be decreased.

However, the conditions are different in the case of the PAL system. If also the sampling frequency $f_s=4f_{sc}$ is selected, then since there is a relationship of $4 \times f_{sc} = f_{sc} = (1,135 + 4/625)f_H$, $4 \times 625 \times f_{sc} = (1,135 \times 625 + 4)f_H$ is obtained. Thus, $4 \times 625$ lines = 4 frames = 8 fields are required to restore an original phase relationship between a horizontal synchronizing signal and a subcarrier.

Accordingly, a memory capacity necessary for signals of the PAL system is $(1,135 \times 625 + 4)$ (samples/frame)$\times 4$ (frames)$\times 10$ (bits)$\div 28.4$ Mbits, and if the number of kinds of signals is 10, then a total of 284 Mbits are required, and if the number of kinds of signals is 30, then a total of 852 Mbits are required. Such large memory capacity requires a large number of devices even if recent large capacity ROMs are employed. Accordingly, such a small-sized, light-weight, inexpensive digital video signal generator as can be carried by a service man, for example, for the repair of a digital VTR, cannot be anticipated.

A similar problem takes place also with a digital video signal generator such as a digital video signal generator of the high quality television system where a large memory capacity is required for one kind of a signal.

SUMMARY OF THE INVENTION

It is an object of the present invention to provide a digital video signal generator which can produce, with a small scale hardware construction of a comparatively small memory capacity, many kinds of digital video signals wherein the phases of a horizontal synchronizing signal and a subcarrier are synchronized correctly with each other such as video signals having a long cycle period or video signals for which a great memory capacity is required for every kind of signals as in the high quality television system.

In order to attain the object, according to the present invention, there is provided a digital video signal generator which comprises at least one set of central processing units, a read only memory in which calculation programs in accordance with which digital video signals are to be calculated by the central processing units are stored, a random access memory for storing therein digital video signals calculated by the central processing units in accordance with the calculation programs, and means for selectively reading out the thus stored digital video signals from the random access memory. The digital video signal generator may further comprise means for receiving a signal kind changing over signal and for causing, in response to such signal kind changing over signal thus received, one of the central processing units corresponding to a signal kind indicated by the signal kind changing over signal to calculate a digital video signal and causing the reading out means to read the stored digital signal from the random access memory. The central processing units may be constituted such that one of them acts as a master central processing unit while the other or each of the others acts as a sub system central processing unit which is coupled to the master central processing unit by way of a telecommunication line.

With the digital video signal generator, not signal data of digital video signals but calculation programs in accordance with which a digital video signal is to be calculated are stored in the read only memory. Since each of such calculation programs is a simple calculation program, for example, for the composition of calculation expressions for the calculation of a sine wave, the storage capacity required for the storage of the calculation programs is small.

Further, also when it is intended to increase the number of kinds of digital video signals, it can be realized readily by addition of a program stored in the read only memory.

It is to be noted that indeed the digital video signal generator includes the central processing units and peripheral circuits for the central processing units as well as the random access memory (RAM) having a capacity necessary for the storage of digital video signals calculated by the central processing units, but while a conventional digital video signal generator involves a number of memories and peripheral circuits therefor which increases in proportion to the number of kinds of signals, the digital video signal generator of the present invention can produce 10 to 30 or more kinds of digital video signals corresponding to a number of kinds of analog video signals only if a hardware construction is prepared which can generate one to several kinds of digital video signals. Accordingly, the digital video signal generator can be obtained with a very small scale hardware construction as a whole.

It is to be noted that, if the central processing units are caused to operate in a parallel relationship such that each of them may generate a digital video signal for a predetermined frame assigned in advance thereto, also the time required for a signal kind changing over operation is reduced compared with such time of the alternative case wherein the central processing units operate in a serial relationship, thereby eliminating a possible disadvantage in use.

Thus, according to the present invention, a digital video signal generator can be provided which can produce, with a small scale hardware construction of a comparatively small memory capacity, many kinds of digital video signals wherein the phases of a horizontal synchronizing signal and a subcarrier are synchronized correctly with each other such as video signals having a long cycle period, for example, in the PAL system and besides which allows addition of a kind of a signal without the necessity of addition of a hardware element.

The digital video signal generator can be made in a small-sized, light-weight and inexpensive construction suitable for the production, repair or the like, for example, of a digital video tape recorder.

The above and other objects, features and advantages of the present invention will become apparent from the following description and the appended claims, taken in conjunction with the accompanying drawings.

BRIEF DESCRIPTION OF THE DRAWINGS

FIGS. 1a and 1b are a block diagram of a digital video signal generator showing a preferred embodiment of the present invention;

DETAILED DESCRIPTION OF THE PREFERRED EMBODIMENT

Figure 1A:
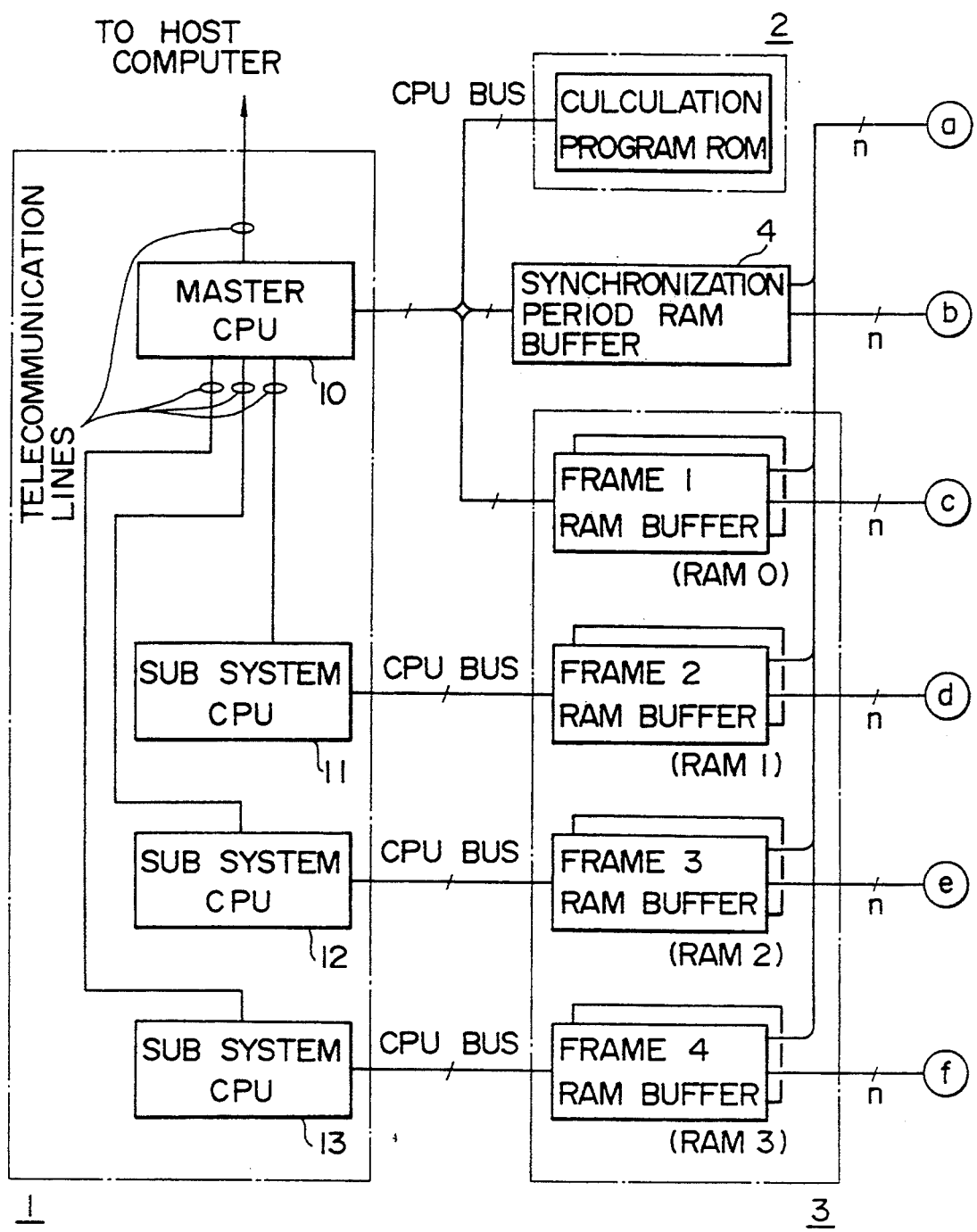

Referring first to FIG. 1, there is shown a digital video signal generator to which the present invention is applied. The digital video signal generator includes a central processing unit (CPU) 1 which can be controlled from a host computer not shown, a read only memory (ROM) 2 in which calculation programs for the calculation of a digital video signal by the CPU 1 are stored, a random access memory (RAM) 3 for storing therein digital video signals calculated by the CPU 1, and several peripheral circuits not shown.

The CPU 1 includes a master CPU 10 and a plurality of, three in the embodiment shown, sub system CPUs 11, 12 and 13 coupled to the master CPU 10 by way of telecommunication lines other than such means that directly couple bus lines of CPUs to each other such as, for example, GP-IB, RS-422 or RS-232C interfaces or some input/output ports.

For example, serial lines are employed to couple the CPUs 11 to 13 to the CPU 10 such that the amount of messages to be transmitted between the CPUs 11 to 13 and the CPU 10 is minimized to raise the independence of the individual CPUs 10 to 13 (loose coupling). Due to such coupling, loads to the individual CPUs can be used almost to writing into the RAM 3.

The ROM 2 in which the calculation programs for the calculation of a digital video signal are stored is constructed such that a calculation program can be read out therefrom in accordance with the necessity for each kind of signal. A calculation expression for the production of a signal waveform can be given, if, for example, a simple sine wave of a sub carrier is taken as an example, by a well known expression such as $y = \sin(bt + c)$, and similar expressions should be combined in accordance with characteristics of a signal. For example, in case a waveform in a horizontal direction of a screen can be produced freely but some patterns should be produced in a vertical direction, for example, like a full field color bar signal or a linearity signal, such signal waveform can be expressed in a short program and may require, for example, about 56 Kbits for one signal kind.

The RAM 3 for storing thus calculated digital video signals therein includes a RAM RAM0 coupled to the master CPU 10 by way of a bus, another RAM RAM1 coupled to the sub system CPU 11 by way of another bus, a further RAM RAM2 coupled to the sub system CPU 12 by way of a further bus, and a still further RAM RAM3 coupled to the sub system CPU 13 by way of a still further bus.

Each of the RAMs RAM0, RAM 1, RAM 2 and RAM3 has a capacity for one frame (for 2 fields) of digital video signals so that they have a total storage capacity for up to 4 frames (8 fields). The digital video signal generator is thus constituted such that digital video signals of the PAL system can be stored for 4 frames necessary to generate accurate signals in which a horizontal synchronizing signal and a subcarrier can restore original phases thereof.

While the necessary capacity of the RAM RAM3 is naturally different when signals of some other system are to be handled, it is apparent that, if, for example, it has a RAM capacity which can cope with a system which requires a maximum capacity, then signals of any other system can be stored sufficiently therein.

For example, if a RAM for the PAL system is provided, then signals of a more complicated pattern of the NTSC system can be stored therein.

It is to be noted that the RAM RAM3 has a capacity sufficient to store signals of a plurality of different kinds therein such that signals of such kinds that have very high frequencies of use can be outputted immediately therefrom in response to a changing over demand.

The digital video signal generator further includes a synchronization interval RAM buffer 4 for storing a signal for a vertical synchronization interval therein.

Stored signals in the RAMs RAM0 to RAM3 and the synchronization interval RAM buffer 4 are selectively read out by a data selector 6, and the thus read out signal of n bits which are suitable for the calculation processing (for example, 8 bits, 16 bits, 32 bits or so) is converted into another signal of m bits (for example, 8 bits, 10 bits or so) of a predetermined digital video signal format by a word length converter 7. The m-bit signal obtained by such word length conversion is outputted from the digital video signal generator by way of a driver 8. Such word length converting processing can be achieved with such a simple construction that, for example, a PLD (Programmable Logic Device) is employed to effect rounding off processing.

Operation of the digital video signal generator described above will be described subsequently with reference to the time charts of FIGS. 2(a) to 2(c).

Figure 2A:
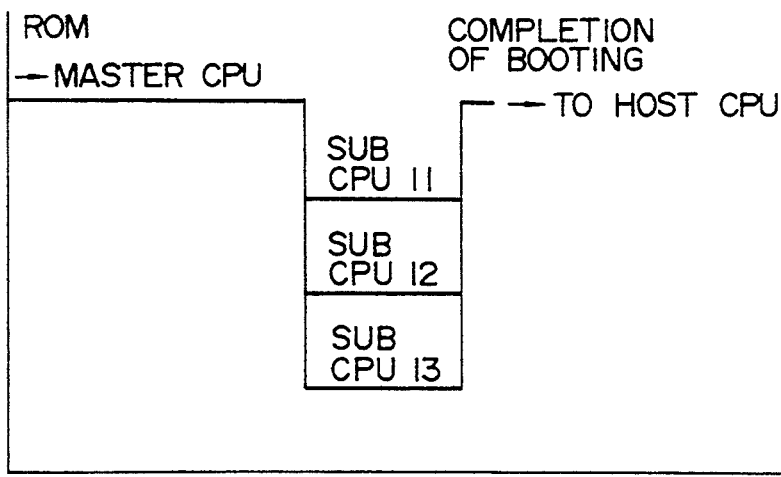
FIGS. 2(a) to 2(c) are time charts illustrating operation of the digital video signal generator of FIG. 1.

FIG. 2(a) illustrates operation of the digital video signal generator upon booting. Referring to FIG. 2(a), upon booting, the master CPU 10 reads the calculation programs from the ROM 2 and transfers to the sub system CPUs 11, 12 and 13 such programs which are to be assigned to the CPUs 11, 12 and 13, respectively. Then, after the four CPUs 10 to 13 enter a condition wherein they wait an executing instruction of the respective programs, a signal representative of completion of booting is transmitted to the host computer.

Figure 2B:
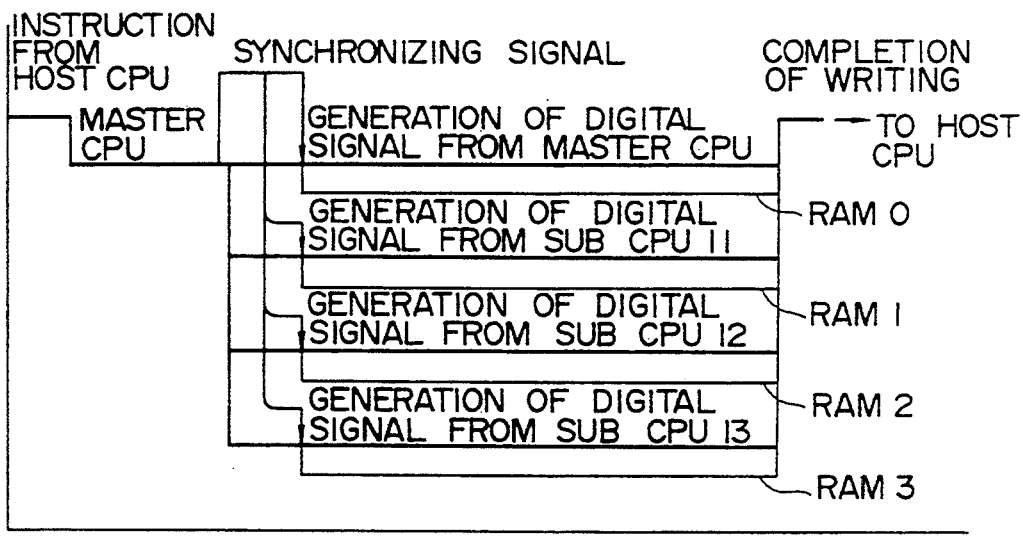

FIG. 2(b) illustrates operation of the digital video signal generator upon storage of data. Referring to FIG. 2(b), the master CPU 10 first operates in response to an instruction from the host computer, and then the master CPU 10 and the sub system CPUs 11, 12 and 13 generate digital video signals for frames individually assigned thereto in advance in a parallel relationship. The digital video signals thus generated are stored or written into the RAMs coupled respectively to the CPUs 10 to 14 by means of the buses. Otherwise, prior to generation of such digital video signals, a composite synchronizing signal for an interval of a vertical synchronizing signal may be stored into the synchronization interval RAM buffer 4 so that a synchronizing signal may be transmitted to the RAMs RAM0 to RAM3 to control the RAMs RAM0 to RAM3 in accordance with the necessity.

Or else, upon reading, successive reading of the RAMs RAM0 to RAM3 may be performed after a composite synchronizing signal is read out by means of the data selector 6.

Figure 2C:
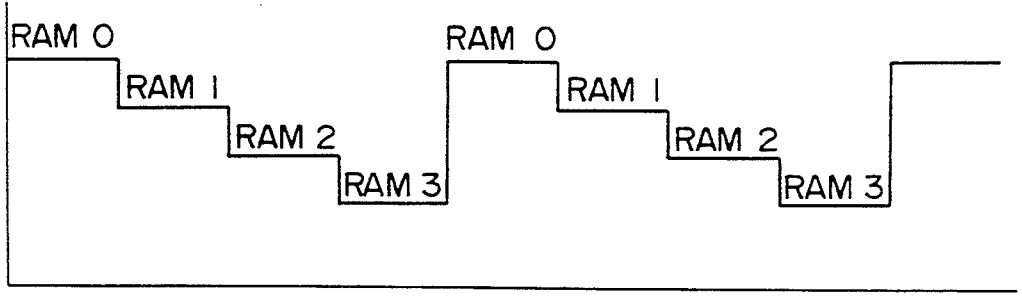
Figure 3A:
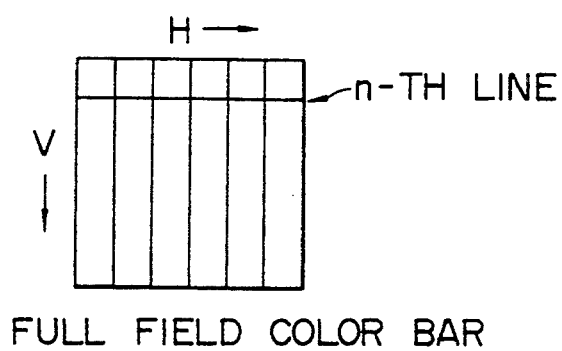
FIG. 3(a) is an illustration showing a screen which includes an indication of same vertical patterns.
Figure 3B:
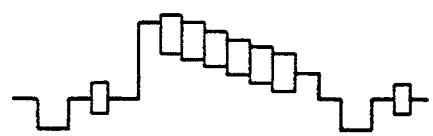
FIG. 3(b) is a time chart illustrating a video signal of the n-th line.
Figure 3C:
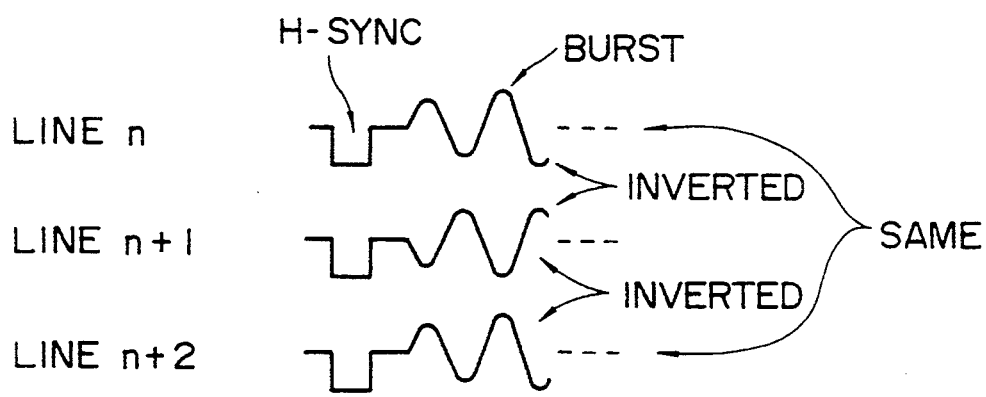
FIG. 3(c) is a waveform diagram illustrating a relationship in phase between a horizontal synchronizing signal and a subcarrier in the case of the NTSC system.

On the other hand, upon reading, that is, upon outputting of a signal from the digital video signal generator, stored signals are successively read out from the RAMs RAM0 to RAM3 frame by frame as seen from FIG. 2(c) to output a digital video signal from the digital video signal generator.

In the digital video signal generator, since the four CPUs 10 to 13 operate in a parallel relationship to each other, a changing over operation between different kinds of signals can be completed in several seconds after reception of a signal kind changing over demand.

With the digital video signal generator having such construction as described above, an occupying area of a printed circuit board in exemplary detailed designing will be such as follows.

Figure 4:
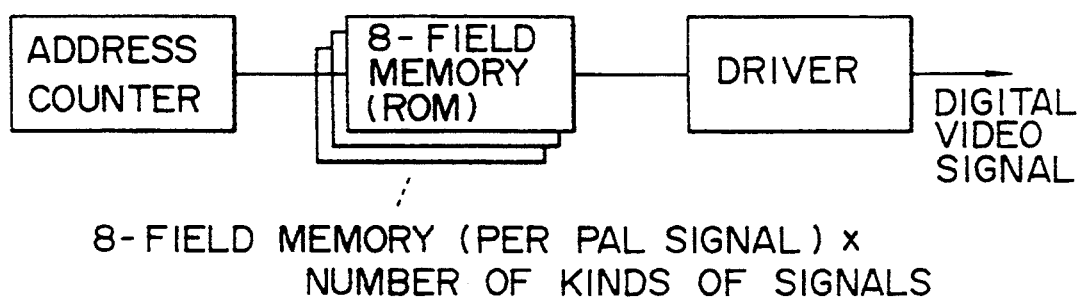
FIG. 4 is a block diagram showing a conventional digital video signal generator.

When, for example, PAL signals of the CCIR D-2 format for 8 fields with a 10-bit width are to be generated, in such a conventional arrangement as shown in FIG. 4, an occupying area of about 600 $cm^2$/kinds of signals is required for additional 88 512-Kbit ROMs of the 8-bit construction per signal kind and for buffers for such additional ROMs.

To the contrary, with the digital video signal generator according to the present invention, if the central processing unit 1 is constituted from four 32-bit CPUs, four RAM sets, four buffer sets, four address data recorder sets, four video RAM controller sets and so fourth, an occupying area of, for example, 560 $cm^2$ is required, and if 141 1-Mbit pseudo SRAMs are used for the RAM RAMS (frame memory for four frames) and the synchronizing interval RAM buffer 4, then an occupying area of about 280 $cm^2$ is required. Further, an occupying area of about 30 $cm^2$ is required for the program ROM 2 and an occupying area of about 60 $cm^2$ is required for the data selector 6, word length converter 7 and so forth. Accordingly, a total occupying area of 930 $cm^2$ is required in the present design.

Accordingly, while the arrangement of FIG. 4 requires 6,000 $cm^2$ for 10 signal kinds, the digital video signal generator of FIG. 1 according to the present design requires 930 $cm^2$ for 10 signal kinds. Such difference increases as the number of kinds of signals increases. While the foregoing comparison is made for an occupying area of a printed circuit board, a similar result will be obtained also for a cost of a part.

Further, the effect of the present invention will be further significant when digital signals having a greater number of bits for one frame for a high quality television system or the like are generated.

Having now fully described the invention, it will be apparent to one of ordinary skill in the art that many changes and modifications can be made thereto without departing from the spirit and scope of the invention as set forth herein.

What is claimed is:

1. A digital video signal generator responsive to an input by a user for generating a plurality of different digital video signals fed to a video device, comprising a central processing unit system including a master central processing unit and a plurality of subsystem central processing units, a read only memory connected to said master central processing unit for storing a plurality of calculation programs in accordance with which different respective digital video signals are calculated by said master and subsystem central processing units, a random access memory system including a plurality of random access memories connected respectively to said master central processing unit and to said subsystem central processing units for storing respectively therein said different respective digital video signals calculated by said master and subsystem central processing units in accordance with respective ones of said plurality of calculation programs fed from said read only memory to said master central processing unit, selector means responsive to the input by the user for selectively reading out stored calculated digital video signals from said plurality of random access memories, and a video device driver receiving said read out signals and for driving said video device based upon said read out signals.

2. A digital video signal generator according to claim 1, wherein said master central processing unit receives a digital video signal kind signal for causing said master central processing unit to read out from said read only memory a calculation program corresponding to a digital video signal kind indicated by the digital video signal kind signal add for causing one of said plurality of subsystem central processing units to calculate a digital video signal and for causing said means for selectively reading out to read out the stored digital video signal from said random access memory system.

3. A digital video signal generator according to claim 1, wherein said means for selectively reading out comprises a data selector having a plurality of inputs respectively connected to outputs of said plurality of random access memories.

4. A digital video signal generator according to claim 3, wherein one of said plurality of random access memories has a capacity of storing signals of a plurality of output signal kinds therein so that frequently used signals of particular output signal kinds are read out substantially immediately in response to a changing over demand.

5. A digital video signal generator according to claim 1, wherein each of said plurality of sub system central processing units is coupled to said master central processing unit by a telecommunication line.

* * * * *

UNITED STATES PATENT AND TRADEMARK OFFICE
CERTIFICATE OF CORRECTION

PATENT NO. : 5,392,394
DATED : February 21, 1995
INVENTOR(S) : Yuichi Hamana

It is certified that error appears in the above-indentified patent and that said Letters Patent is hereby corrected as shown below:

Col. 2, line 21, change "$f_{sc}$" second occurrence, to --$f_s$--

<u>In the Claims:</u>

Col. 8, line 1, change "add" to --and--

Signed and Sealed this

Ninth Day of January, 1996

BRUCE LEHMAN

Attest:

Attesting Officer

Commissioner of Patents and Trademarks